March 17, 1964 L. KULL 3,125,672
CARD CONTROLLED PROGRAM DEVICE
Filed Nov. 10, 1961 4 Sheets-Sheet 1

INVENTOR.
Leo Kull
BY

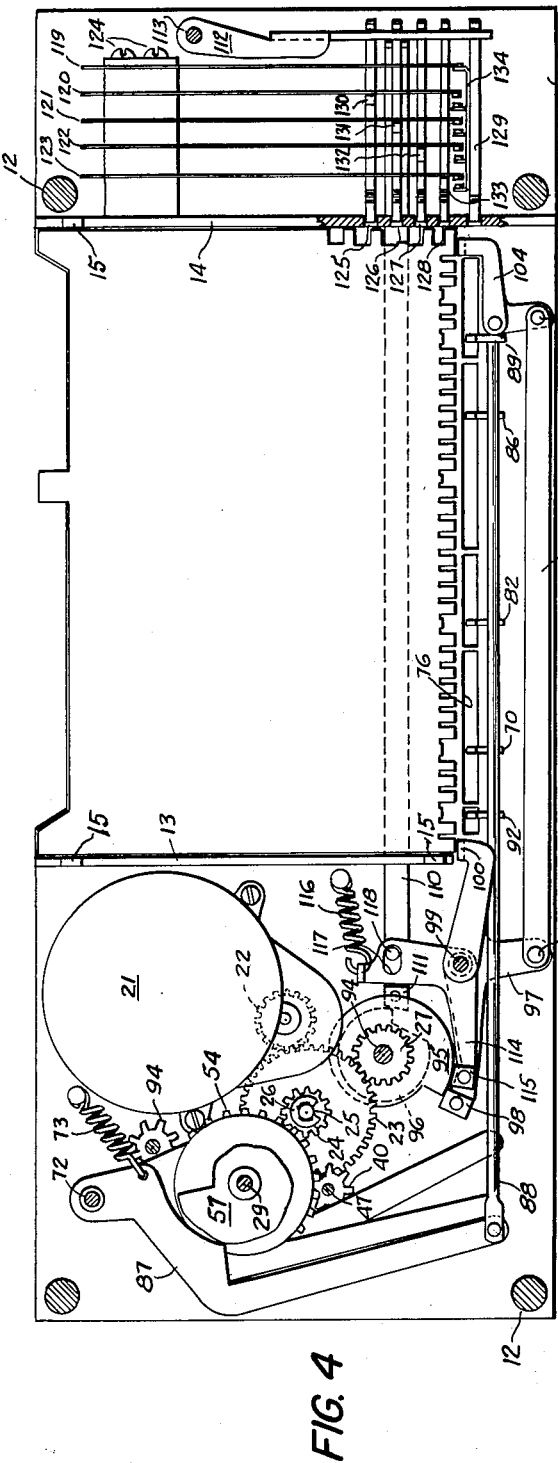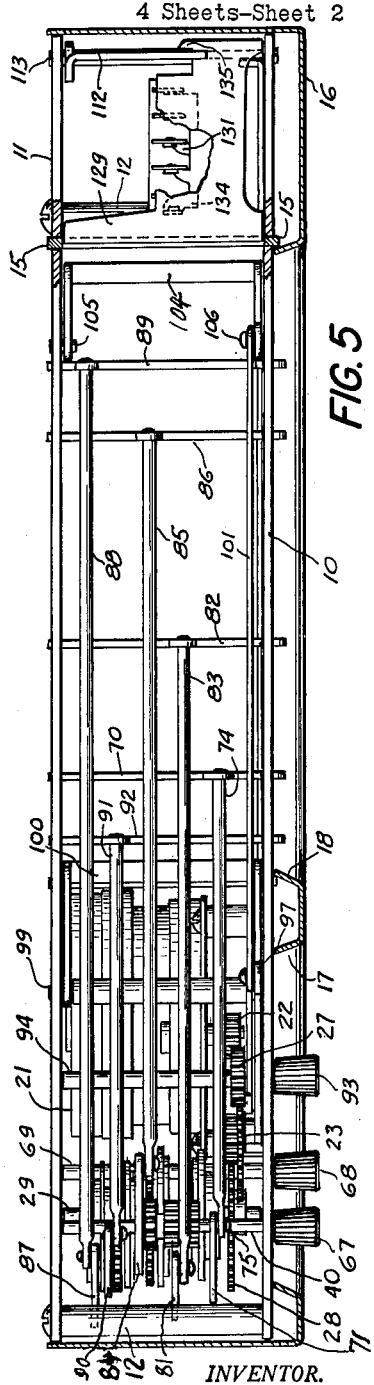

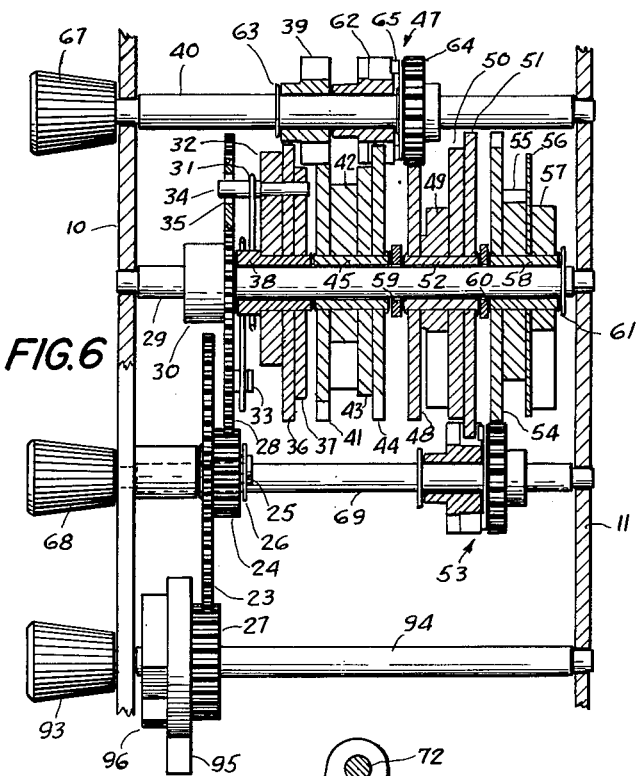
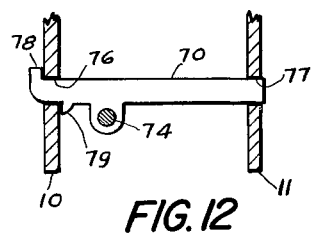
FIG.12
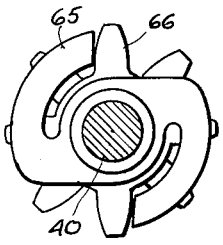
FIG.11
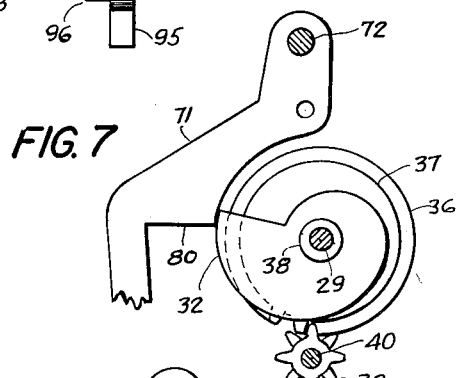
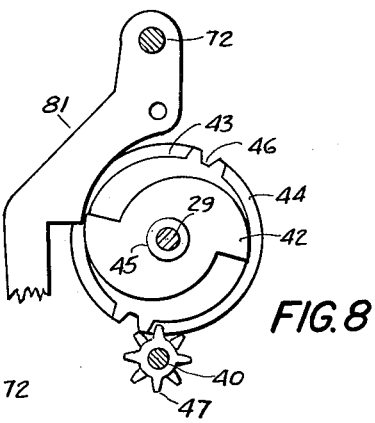
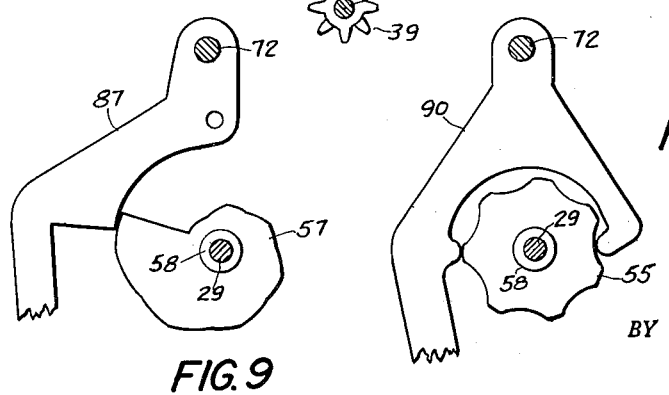
INVENTOR.
Leo Kull
BY March 17, 1964 L. KULL 3,125,672
CARD CONTROLLED PROGRAM DEVICE
Filed Nov. 10, 1961 4 Sheets-Sheet 4

INVENTOR.
Leo Kull
BY

United States Patent Office 3,125,672
Patented Mar. 17, 1964

1

3,125,672
CARD CONTROLLED PROGRAM DEVICE
Leo Kull, 2 Washburn Place, Jersey City, N.J.
Filed Nov. 10, 1961, Ser. No. 152,134
14 Claims. (Cl. 235—61.11)

This invention relates to a program device responsive to pre-determined time cycles and more particularly to devices employed in large time systems.

Heretofore, devices of the type referred to were so-called program clocks which had to be able to select every minute of the day or week and give an output signal, usually dependent on an electrical switching action. The pre-selected precise time pulses are useful to ring a bell or provide visible signals in various departments of a schoolhouse, an office building, factory, etc. Using relay systems, further control of time can be obtained like switching lights and electrical equipment on and off.

In order to maintain a convenient control over a multi-circuit program schedule, it becomes important to provide a device which can be set up by unskilled personnel without the use of special tools and without making delicate adjustments of mechanisms. The schedules of program devices are often changed or special programs desired on a certain day and it is also desirable to do this with a minimum effort or expenditure of time effort.

The use of rotating drums or moving tapes, as embodied in prior devices in this field, presents the difficulty of setting and changing a schedule and requires complex and costly mechanisms.

My invention aims to eliminate the above problems by providing a device in which a file card, plate or similar article is used for each program time, which makes it possible to enclose the mechanism and contacts and provide an open pocket for the cards or the like. The arrangement is similar to a card index file and all the practices known in the filing card art can be advantageously employed. A great number of program cards can be filed in a card pocket in a comparatively small space and any desired order of cards can be used. Numbering and recording the cards renders facile the changing, removing and adding of special cards.

Basically speaking, in the use of my device a double sensing of the cards is performed; first, one card is selected out of a pack of cards by comparing or registering notches or recesses formed in the edges of the cards in relation to time bars which are moved by a mechanism providing a time cycle. If the time information of a card coincides or comes into registry with the location of time bars, that particular card can drop a short distance, after which the side of the card is sensed. This determines the circuits or circuits which will be operated by such dropped card.

One object of the invention, therefore, is to provide a program card which can be sensed in a device containing a mechanism providing a time cycle.

A further object is to provide a program card with circuit selection intelligence which can actuate circuit selection contacts.

Another object of my invention is to provide a mechanism providing a time cycle to move time bars and control a sensing cycle.

A further object is to provide facile time-of-day setting means by breaking down long time cycles.

2

The invention is illustrated in the accompanying drawings in which:

FIG. 4 is a rear view of the program device with the backplate thereof removed.

FIG. 5 is a bottom view of the device with the case in section.

FIG. 6 is an enlarged view of the time train.

FIGS. 7 to 10 are details of the time cams shown in FIG. 6.

FIG. 11 shows a Geneva pinion-clutch for time setting.

FIG. 12 is the detail of a time bar and its mounting.

Figures 2, 3:
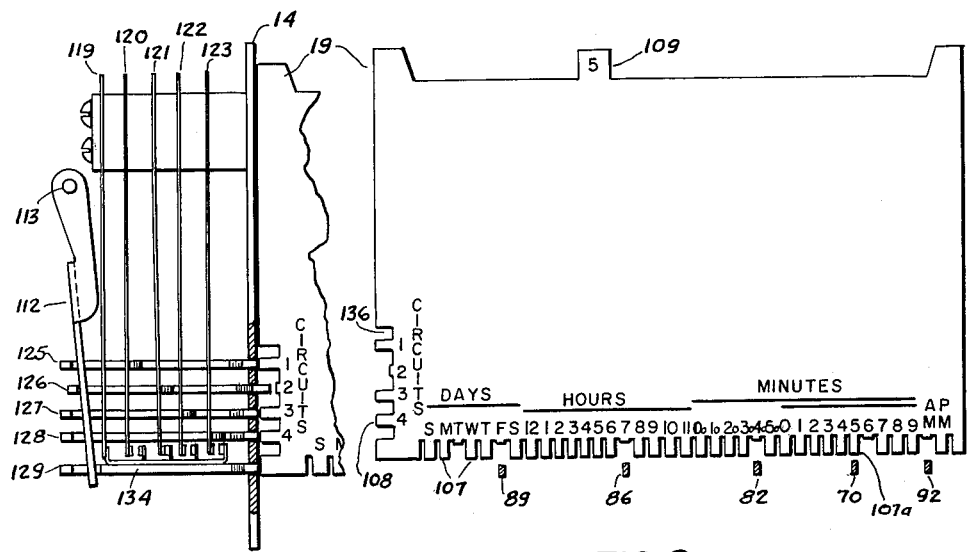
FIG. 2 shows a program card having time bars therebeneath.
FIG. 3 shows a section of a card with sensing contacts operated in relation to the card.

Referring first to FIGS. 1 to 6 of the drawings there is shown a structure comprising plates 10 and 11 and having spacing pillars 12 between them and two parallel plates 13 and 14 held between plates 10 and 11 by means of tabs 15. A case or box 16 covers the structure and has an opening at its top for the time cards and at its front, openings 17 and 18 providing access to setting knobs and visibility for a time scale respectively.

Within the structure and box 16 are mounted a novel time train with a sensing cycle. As illustrated, a 7-day, 1-minute (10,080 minutes) program cycle is shown, which is broken down into seven days with a.m.–p.m. selection, twelve hours and sixty minutes; the latter being again divided into six 10-minute groups and ten 1-minute divisions. A straight line time scale of this kind is printed on each program card 19 (FIG. 2) and also on a time scale 20.

A time mechanism such as a synchronous motor 21 drives through proper reduction gears and Geneva drives, a set of cam wheels hereinafter described in detail. A motor pinion 22, secured to the output shaft of motor 21, drives a wheel 23, rotatable freely together with a pinion 24, on a post 25 and axially positioned by means of a retaining ring 26. Wheel 23 drives a pinion 27 together with its cams, hereinafter identified, with a speed of one r.p.m. and the pinion 24 imparts to a wheel 28 a speed of 1/10 r.p.m. Wheel 28 is secured to a shaft 29 by means of a hub 30 and rotates freely between plates 10 and 11.

As best shown in FIG. 6, wheel 28 drives through a torsion spring 31, an assembly including a cam 32 which is loose on shaft 29. One end of the spring 31 rests against a lug 33, struck out from the stock of wheel 28 and the other end of it rests against a pin 34, staked to the assembly which includes cam 32. The pin 34 is held by the spring 31 against the wall of an elongated hole 35 cut into the wheel 28, and the two assemblies are normally driven together. However, for reasons described later, wheel 28 can rotate a short distance alone if the cam 32 is stopped. Next in sequence to cam 32 is a Geneva drive disc 36 and a lock disc 37, all three being secured to a hub 38, loose on shaft 29. Disc 37 drives through a Geneva pinion 39, loose on a shaft 40, a wheel 41 on shaft 29 with a Geneva reduction of 12 to 1.

Next to wheel 41 is a two-step cam 42, a drive disc 43 and a lock disc 44, all secured to a hub 45, loose on shaft 29. Drive disc 43 has two carry-over teeth 46 and drives through a modified Geneva pinion 47, a wheel 48 with a Geneva reduction of 6 to 1.

Next in sequence to wheel 48, is a one-step cam 49, a Geneva drive wheel 50 and a lock-wheel 51, all four again mounted on a hub 52, loose on shaft 29. Drive wheel 50 drives through a Geneva pinion 53 a wheel 54 with a Geneva reduction of 14 to 1.

Next in sequence to wheel 54 is an a.m.-p.m. star cam wheel 55 (FIG. 10), a separating disc 56 and a cam 57, all four mounted on a hub 58, loose on shaft 29. To keep the wheel assemblies axially positioned on shaft 29, washers 59 and 60 are employed and a retaining ring 61 at the end of shaft 29.

Geneva pinion 47 is made in two parts; a driver part 62, loose on shaft 40, but axially positioned against driver pinion 39 by a retaining ring 63, and a pinion part 64, secured to shaft 40. A two-ended clutch spring 65 (FIGS. 6 and 11) staked to pinion 64, locks against the full teeth 66 (every second one) of pinion 62 and the assembly acts as a common Geneva pinion during time drive but permits a one direction manual setting of the cam wheels from a knob 67. Pinion assembly 53 is split identically as pinion assembly 47 and a knob 68 is used to drive a shaft 69 and wheel 54 manually.

Referring now to FIGS. 2, 4, 5, 7 and 12, means are provided to select a card from the pack of cards as soon as time advanced bars are reaching the position which coincides with the missing prongs on the edge of a program card. In the present embodiment, five time bars are used. Of these, a minute time bar 70 is driven by cam 32 which completes its revolution in ten minutes. A cam follower 71 is pivotally mounted on a post 72 (FIG. 7) and urged by a tension spring 73 against the cam surface. A connecting rod 74 is pivotally secured at 75 (FIG. 5) to the follower 71 and the other end of the rod 74 is staked to the time bar 70. The ends of time bar 70 (FIG. 12) are guided in horizontal slots 76 and 77, cut into the plates 10 and 11. Front plate 10 also is used to guide the time bar 70 laterally by means of tabs 78 and 79. Tab 78 extends over the time scale 20 (FIG. 1) and serves also as a time teller.

Starting from the low part of cam 32 the time bar 70 reads "0" and as the cam continues its rotation it will read 0 to 9. During the drop, the next cam 42 will be advanced through the Geneva pinion 39 one step. Cam follower 71 is designed at 80 in such a way that the energy, stored in spring 73, can assist the advancement of next wheels.

Cam 42 advances the ten-minute groups and has two cam steps (FIG. 8). Starting from 00 it advances to 50 a follower 81 in steps of 10, and drops then to 00 again. During the drop, the hour cam 49 will be advancing one step. The Geneva drive wheels 43 and 44 are advancing the hour wheel 48 two times during a revolution of their two driving teeth 46. A follower 81 for the cam 42 moves a time bar 82 by means of a connecting rod 83.

Hour cam 49 actuates a follower 84 with a connecting rod 85 and time bar 86 similarly to FIG. 7 except there are 12 steps and divisions on time scale 20.

Hour cam assembly drives through Geneva pinion 53 the day cam 57 and a.m.-p.m. cam 55. The day cam advances 14 steps per revolution, but has the cam rise only every second step (FIG. 9). A follower 87, connecting rod 88 and time bar 89 are similar to the corresponding parts previously described.

The a.m.-p.m. cam 55 has seven high and seven low portions (FIG. 10). A special springless follower 90 will be reciprocated by the cam 55 and a connecting rod 91 moves the time bar either to a.m. or p.m. position. The day cam 57 will be advanced twice a day as the twelve hours are completed. At midnight the rise of cam 57 advances the time bar 89 to a new day position and changes the p.m. to a.m. At noon, there is no rise on cam 57 but the a.m. will be changed to p.m.

The problem of setting the long time cycle, in order to make it faster, is accomplished by breaking the cycle down. A knob 93 may be used to turn shaft 94 and pinion 27 will drive the minute cams 32 and 42. The synchronous motor 21 has a built-in one-way clutch (not shown) which makes the slip during setting possible. The hour cam 49 may be set by knob 67, the novel Geneva pinion 47 making such a setting possible. Similarly, days can be set independently from knob 68. The setting should be started from minutes and continued down to hours and days. The time is indicated by the ends of time bars, reading on time scale 20.

Pinion 27 drives two cams 95 and 96, which control the sensing cycles. During every minute a lifting and drop-off mechanism (FIGS. 3 to 5 and 13) lets the cards drop down to the time bars, next the contact sensing takes place and the cards are lifted up again to clear the time bars. The lifting and drop-off mechanism comprises a follower 97 which has a nylon block 98 at its follower end for reducing friction, is pivoted at 99 and is controlled by the cam 95. Another end 100 of the follower 97 is formed in U-shape for lifting up the edges of cards. A connecting link 101, having pivoting points at 102 and 103, transmits the motion of the follower 97 to another U-shaped lever 104, which has its pivoting studs 105 and 106 staked to main plates 10 and 11. The cam 95 thus lifts up all the cards slowly and lets them drop to the time bars.

Time or program cards 19 (FIGS. 2 and 4) can be formed from thin sheet metal, plastic, or any other stiff material. The lower edge of each card is provided with a time scale and tabs 107 which overlie the positions of the time bars. The left side of the card has tabs 108 for controlling the output circuit contacts, presently to be described.

In preparing a program card, it is necessary only to remove the tabs on the desired time and circuits. To get a contact closure at least five time tabs and one circuit tab have to be removed. In some cases one card can be used to act on several time points. For instance, if the same time signal is desired on all workdays, all five workday tabs have to be removed. As a rule, a single card can be used for time information which has the same circuit information and something common from the fastest time groups up. For example a card which has Mon., Fri., 2, 5, 12 hour, 47 min. and p.m. prongs removed becomes active 6 times in a weekly cycle.

In FIG. 2 the time information shown on card 19 is Tuesday and Friday 7:46 a.m. and circuit number 2. The time bars underneath the card read Friday 7:45 a.m. which means that at said time the card will be still prevented from dropping by prong 107a, but can drop the next minute and close circuit number 2, as shown in FIG. 3 and described later.

Figure 1:
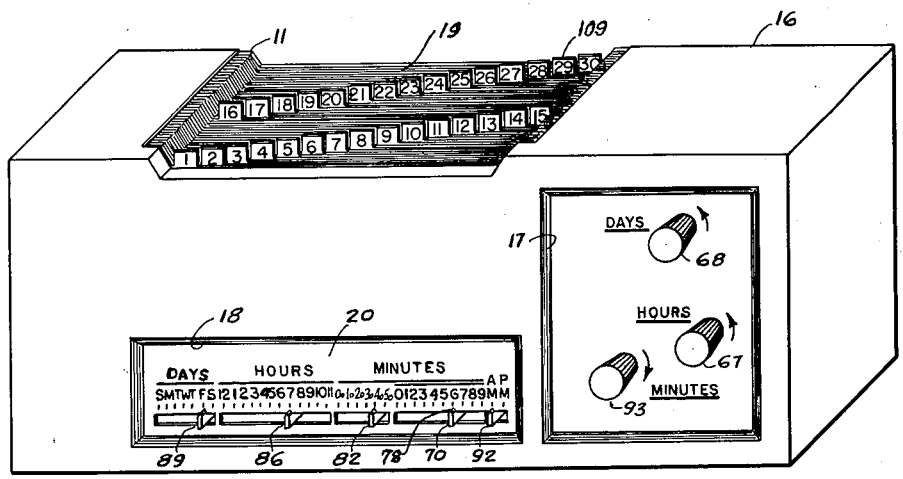
FIG. 1 is a perspective view of the program device.

The upper edges of the cards whch extend out of the card pocket can be provided with identification tabs 109 (FIGS. 1 and 2). Various colors and other practices well known in file card practice can be employed here for convenient access or groupings.

The circuit contacts are actuated by cam 96 which has a follower 110, provided with a nylon block 11 secured to one end of it, resting against said cam and the follower is guided in notches (not shown) cut in plates 13 and 14. The other end of the follower 110 rests against a contact actuating lever 112, pivoted on a post 113. A few seconds after the drop of follower 110 an L-shaped follower 114 for the cam 95 causes the follower 110 to be returned. Follower 114 also has an nylon block 115 at one end, is pivoted at 99 and is urged by a tension spring 116 against cam 95. Follower 114 has an elongated hole 117 in it which receives a pin 118, staked to follower 110. As the follower 110 drops, its pin 118 will stay on the left side of the hole 117. Next, the follower 114 drops and its spring 116 cause sit to swing clockwise and the follower 110 will be returned.

A five blade contact assembly (FIGS. 3 and 4) consists of a common contact blade 119 and four circuit contact blades 120, 121, 122 and 123. Well known insulating blocks and sleeves are used and the complete assembly is secured to plate 14 by screws 124.

Five sensing plates 125, 126, 127, 128 and 129 (FIGS. 3 and 4) made from insulating material or from metal but insulated from the contact blades, engage in guiding slots in plate 14 which locate them across the pack of cards. Plate 125 has a tooth 130 which keeps contact blade 120 to the right against its spring force. Similarly, plates 126 to 128 have teeth 131 to 133 working together with blades 120 to 123 respectively. Sensing plate 129 has a common contact strip fastened to it which is in contact with blade 119. All sensing plates are normally kept to the right (FIG. 3) by the contact lever 112 which is held against tabs 135 by follower 110. Consequently all the contact blades are controlled by cam 96 and the sensing plates normally clear the cards.

If all the sensing plates 125 to 129 can move the same distance the parallelism remains unchanged and the contacts stay open. If the cards are dropping to the time bars but all of them are stopped, the clearance slots 136 stay opposite sensing plates 125–129 and all of them can move the same distance after the cam drop. If one card can drop down but all the circuit prongs 108 are present, all the contact plates are stopped and the contacts remain open. However, if one or more contact prongs 108 are cut off, those contacts will be closed. Thus, in FIG. 3 the card has been dropped and as contact prong numbered 2 has been cut off, the sensing plate 126 can move in and its contact blade 121 closes against the common contact strip 134.

The operation of the programmer may be briefly summarized as follows: synchronous timing motor 21 rotates the sensing cycle cams 95 and 96 with the speed of 1 r.p.m. and also rotates the cams, which cause the time bars to have a different relative position at every minute of a 7-day cycle. All the cards are permitted to drop to the time bars periodically once in a minute. The 1 r.p.m. drop-off cam 95 is geared to the time bar cams and secures the position of time bars to be exactly on the minute at the moment of drop-off. If all the cards are stopped by time bars, no contact closure takes place. If one card has at least five tabs cut off which coincide with the position of time bars, that card can drop further and as the contact follower 110 drops, the common contact strip 134 will be stopped and the contact blade, whose corresponding tab is cut off, can move further and close against the common contact strip 134.

In the every-minute cycle, first the cards are permitted to drop and the card selection takes place. Then the contact follower 110 drops and a few seconds later it returns rapidly. This arrangement makes possible the duration control of contact closing time, which is desirable in case the programmer is used for ringing a bell. As the last step of the cycle, a slow card rise follows. Since the cards might not be fully lifted up before a moving time bar can reach the next prong, a jamming might result, but this is avoided by clutch spring 31 which lets the motor to continue its drive.

Figure 13:
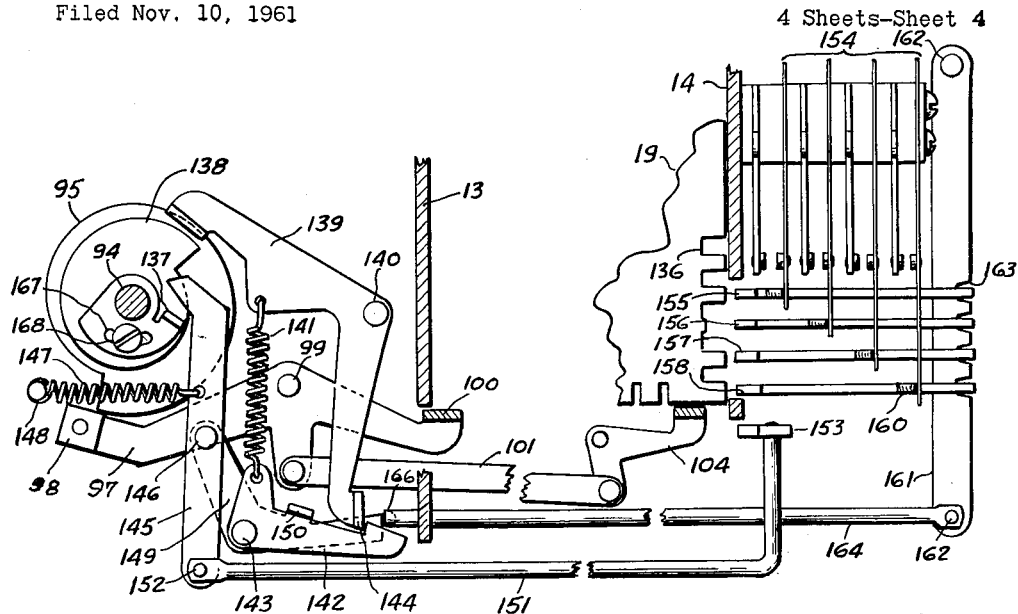
FIGS. 13 and 14 show a modified contact control in different positions.
Figure 14:
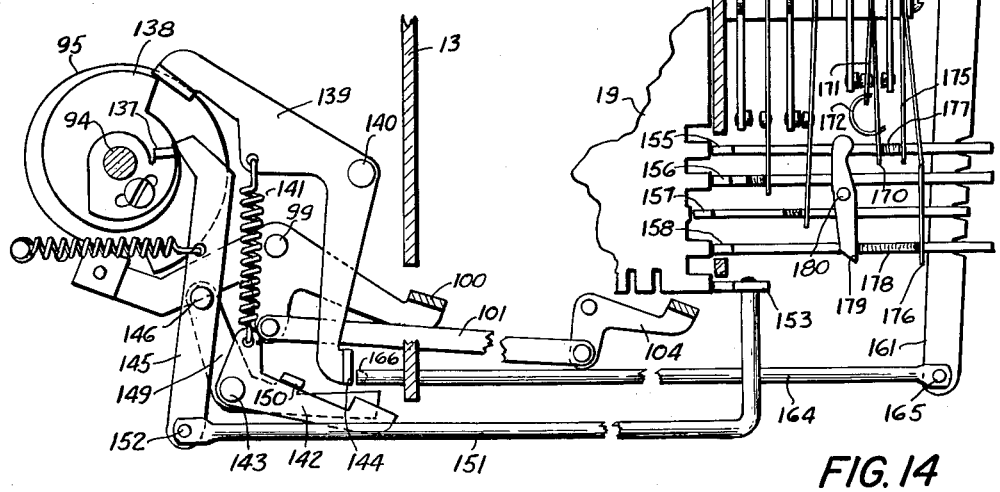

A modified contact actuating mechanism is shown in FIGS. 13 and 14 which is more complex but has certain advantages over the one just described. In a program cycle only a small percentage of time points are giving a contact closure and a minute to minute circuit sensing is not necessary. The sensing cycle, controlled by 1-minute cams is therefore different from the one described previously.

Shortly after time sensing which is controlled by cam 95 and which lets the card lifters 100 and 104 to drop, a light sensing action takes place which results in no further action if there was no card drop or which unlatches a circuit sensing mechanism only if there was a card drop. The circuit sensing mechanism is controlled by a cam lug 137 and a cam 138 which are rotated together with cam 95 by shaft 94. Cam 138 has a follower 139, pivoted at 140 and urged by a spring 141 against said cam. Spring 141 also keeps a latch 142, which is pivoted at 143, engaged with a bent-over end 144 of lever 139. The cam lug 137 controls a lever 145 which is pivoted at 146 and urged in a counterclockwise direction by a spring 147, which is secured to a post 148. Pivot pin 146 is secured to an arm of a lever 149 which has a common pivot with latch 142 at 143. A lug 150, bent over from the stock of lever 149, engages the latter with latch 142 during unlatching but permits individual return for them. A sensing link 151 is pivotally secured to the other end of the lever 145 at 152. A sensing plate 153 is secured to the other end of link 151 and can be conveniently guided by slots cut into plates 10 and 11.

Figure 15:
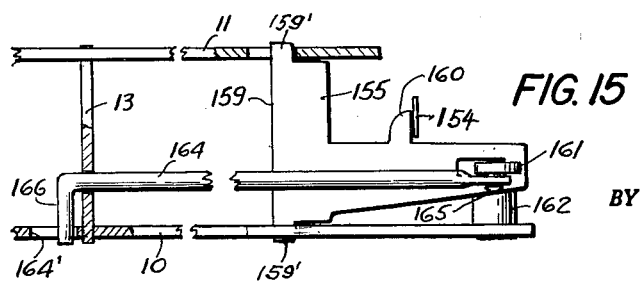
FIG. 15 is a bottom plan view of a circuit sensing plate shown in FIGS. 14 and 15.

Four pairs of ordinary contacts 154 are shown which have their contact leaf springs adjusted for a normally closed position. All the contacts are normally kept open, however, by sensing plates 155, 156, 157 and 158. A detail of a sensing plate is shown in FIG. 15 and comprises a sensing end 159 extending across all the cards and the ends 159' of said plate are guided in slots cut into plates 10 and 11. Each sensing plate 155 to 158 has a tooth 160 at a distance corresponding to the position of its contact. Teeth 160 keep the contacts 154 open in a manner described before. A contact operating lever 161 pivoted at 162 extends through apertures cut into plates 155 to 158 and keeps them in parallel relationship by means of notches 163, cut in lever 161. A connecting link 164 at one end is pivotally secured at 165 to lever 161 and has its other bent-over end 166 guided by extending through a hole in plate 13, a slot 164' in plate 10 and it rests against lever 149. Link 164 therefore serves the purpose of keeping all contacts open.

If after time sensing, there is no card drop, cam lug 137 pivots the differential lever 145 about point 146 which causes the sensing plate 153 to move to the left. This is just a light sensing resulting in no further action. If, however, there was a card drop (FIG. 14), plate 153 and point 152 are stopped which causes lever 145 to be pivoted about point 152. This swings point 146 to the right which causes unlatching of lever 139 and contact link 164. The latter releases the senisng plates 155 to 158 and they are free to move to the left. The contact closures are controlled now by the existing or broken off tabs of the card which was allowed to drop; the existing tabs stop the sensing plates and prevent a contact closure, while a missing tab lets its corresponding plate complete its movement and close its contact. It has to be noted again that the rest of the cards cannot prevent the movement of plates 155 to 158 because of clearance notches 136 between tabs. In FIG. 14 sensing plate 157 encounters a missing tab and its contact is closed. At the unlatching moment, the cam lever 139 was stopped by cam 138 and did not prevent the aforementioned movement of link 164 and as the drop of lever 139 takes place a few seconds later, it is activated as the stored energy in spring 141 is released. This swings lever 139 in a counter-clockwise direction, its lug 144 contacts the end 166 of link 164, and opens the contacts thereby. The duration of closing time is thus controlled by the unlatching moment and the drop of lever 139. To make this time interval adjustable, a screw 167 in a slotted hole 168 can be used to change the relationship of the drop of cam 138 and cam lug 137.

During the next minute cycle, the energy of spring 141 is restored and link 164 and lever 139 will be held by latches 142 and 149. The next unlatching cannot take place before there is a card drop-off. The arrangement avoids unnecessary wear on cams and followers and it uses the maximum driving torque only after a contact actuation to restore the energy of spring 141. Further, the contact blades will be moved only when there is a card drop and the life of them will be increased too.

FIG. 14 also illustrates the control of an on-off circuit using a conventional two position microswitch 169 which can be operated by a "mechanical pulse" and can retain either of its two positions. It has an operating leaf 170, a contact leaf 171 and an overcenter spring 172 which can keep the contact leaf 171 against the left or right of stationary contacts 173 or 174. The first and fourth sensing plates 155 and 158 respectively, have spring leafs 175 and 176 resting against their corresponding lugs 177 and 178. If the first sensing plate 155 can move to the left, the energy of spring 175 is imparted to lug 177, which pushes leaf 170 over to the left and causes the contact leaf 171 to snap over to the right. Similarly, the left side of lug 178 on the plate 158 operates a motion reversing lever 179, pivoted at 180. If plate 158 can drop now, lever 179 pushes leaf 170 to the right and contact leaf 171 will snap to the left again as shown in FIG. 14. It is obvious that the sensing plates 155 and 158 can operate also pulse contacts simultaneously with the operation of the on-off switch.

It will be appreciated that alternatives and modifications are possible in various details of the invention. For example, the capacity of the card pocket can be greatly increased by increasing the length of the time bars and corresponding parts. In that case, however, a greater power source will be necessary to actuate the every minute cycle. Also a master clock control, which is common practice in modern time systems may be employed. A minute time pulse of such master clock can be used to start a motor for actuating the every minute sensing cycle. For automatic correction, a permanent card can be used in the machine which compares the time for hourly or twelve hour correction and in case a correction is needed, it causes the reception of correcting pulses until the time is correct.

The number of contacts can be greatly increased using wider cards with contact tabs at one or both side edges. Longer time bars permit convenient grouping using separate pockets with independent sensing and contact blades. Separating plates are desirable also in smaller pockets to reduce the lateral friction of the card packs and guarantee a safe drop-down of the cards.

The same result of advancing the time keeping cams can be obtained with a well known cam and ratchet drive, but this cannot be considered as positive a drive as the Geneva drive.

Various other modifications may be resorted to within the range of engineering or skill in the art. It is the intention, therefore, to be limited only by the scope of the following claims.

What I claim is:

1. In a card controlled program device, a mechanism providing a time cycle divided into time units, each containing time divisions, program cards containing program information, time and output sensing means for cooperation with said program cards, a plurality of movable time members, one said time member for each said time unit, the movement of said time members being controlled by said time cycle mechanism, said movable time members reaching a different relative position in respect to each other and said time divisions during each consecutive time division in excess of said time cycle, said program information on said program cards corresponding to said time divisions and being provided by severable tabs on the program cards and being rendered effective for a definite time by severing tabs from said program cards corresponding to the desired time divisions in a manner that at least one division for each said time unit is severed off, said severed off tabs providing recesses adapted for registry with the positions of said movable time members once during each of said time divisions, whereby a coincidence between all said movable time members and said recesses provided by the severed off tabs will permit a movement of said program card relative to the other cards and said movement means operative by said movement for causing an output effect to occur on the time point indicated by said severed off tabs.

2. A card controlled program device according to claim 1, wherein movement of said program cards renders different areas of said program cards active for a secondary sensing by means which cause one or more different output effects, said output effects being activated by the recesses provided by the severed tabs only for the card which had said movement caused by said coincidence.

3. In a card controlled program device, a mechanism providing a time cycle divided into a number of time divisions, each again divided into time units, each having its own time sub-cycle, a pack of program cards each containing program information along one edge thereof, time bars each controlling a time sub-cycle, said time bars reaching a different relative position in respect to each other and said time divisions during each of the consecutive time divisions in excess of said time cycle, said time bars moving in straight lines parallel and close to said programmed edge of said program cards, said edge containing a time scale corresponding to the positions of said time bars, said program information being made effective by providing recesses in said programmed edge of said program cards on desired time divisions with at least one division per each said time unit, said program cards having actuating means keeping them normally clear from the path of said time bars during a fraction of said time division and letting them move toward the time bars once during each of said time division, each of said time bars being able to stop the movement of said program cards, said movement being completed only in case of registration between all of said time bars and said recessed time divisions in said program card, said completed movement of one of said program cards rendering that card effective for giving an output effect.

4. A card controlled program device according to claim 3, wherein the program device is housed within a casing having a stationary visual straight line time scale similar to the one printed on each said program card and said time bars are used for telling the time of day in respect of said straight line time scale.

5. A program device according to claim 3, wherein said program cards each has on an adjacent edge of the card, means for providing secondary recesses and sensing means operable upon completed movement of a program card during each of said time division for cooperating with said secondary recesses.

6. A card controlled program device according to claim 3, wherein said mechanism providing the time cycle rotates time cams in which the completion of each fastest time sub-cycle advances the next one in the slower order one time division and said time cams have cam followers for moving said time bars.

7. A card controlled program device according to claim 6, wherein said time cams are advanced by a ratchet drive, said time cams having followers moving said time bars and ratchet pawls for advancing the next slower wheels at the end of completion of each faster time sub-cycle.

8. A card controlled program device according to claim 6, wherein said time cams are advanced by a Geneva drive having cam followers linked to time bars and said time bars are engageable in the recesses in the edges of said program cards containing said time information.

9. A card controlled program device according to claim 8, wherein said time cams which are advanced by the Geneva drive comprise Geneva drive discs, Geneva locking discs, and a Geneva pinion, said Geneva pinion being mounted loosely on a shaft and coupled by a one-way step clutch to a drive pinion secured to said shaft, said shaft being provided with a setting knob for manual adjustment of said time cams and said adjustment being made possible by said one-way step clutch, said step in said clutch equalling one time division.

10. A program device according to claim 5, wherein the secondary sensing follows said time sensing during each said time division, said secondary sensing being responsive to said completed or incompleted movement of one of said program cards, the sensing of said incompleted movement resulting in no further action while the sensing of said completed movement of one of said program cards activates a sensing action for giving an output effect.

11. A program device according to claim 5, wherein the recesses in the edges of the cards are provided by severable tabs on the cards, and said tabs on an effective program card controls an independent output effect which is activated by the presence and absence of such tab.

12. A program device according to claim 11, wherein said sensing action for giving an output effect senses the existence or absence of one or more contact tabs located at right angles to said time tabs on said program cards, the existence of said contact tab preventing a contact actuation while the absence of said contact tab permits a contact actuation to take place, the return of said contacts being activated by the release of stored energy in a control spring means during said sensing cycle, said energy being released shortly after said contact sensing and only when said contact sensing has taken place.

13. A program device according to claim 11, wherein two of said severed or unsevered tabs in a series of said program cards control a bi-stable output device, each said program card having only one said severed tab, the sensing of said severed tab space resulting in a movement for overthrowing said bi-stable device to one of its positions, the sensing of the other severed tab space in a different program card in said pack resulting in a movement for returning the said bi-stable output device to its original position.

14. A program device according to claim 12, wherein said contact sensing and said stored energy are released by individual cams rotated in unison, the relationship of said cams controlling the closure time of said contacts and said relationship of said individual cams being adjustable in a shorter extent of said sensing cycle to control the closure time of said contacts.

References Cited in the file of this patent

UNITED STATES PATENTS

| | | |
|---|---|---|
| 702,808 | Lyman | June 17, 1902 |
| 2,501,274 | Hamilton | Mar. 21, 1950 |
| 2,774,963 | Melick | Dec. 18, 1956 |
| 2,918,656 | Nolde | Dec. 22, 1959 |

UNITED STATES PATENT OFFICE

CERTIFICATE OF CORRECTION

Patent No. 3,125,672          March 17, 1964

Leo Kull

It is hereby certified that error appears in the above numbered patent requiring correction and that the said Letters Patent should read as corrected below.

In the heading to the printed specification, line 3, for "Leo Kull, 2 Washburn Place, Jersey City, N. J." read -- Leo Kull, Jersey City, N. J. (2 Washburn Place, Caldwell, N. J.) --; column 1, line 53, for "circuits", first occurrence, read -- circuit --; column 3, line 53, for "advancing" read -- advanced --; line 55, for "of" read -- with --; column 4, line 74, for "cause sit" read -- causes it --.

Signed and sealed this 28th day of July 1964.

(SEAL)

Attest:

ESTON G. JOHNSON
Attesting Officer

EDWARD J. BRENNER
Commissioner of Patents